United States Patent [19]

Gee, Sr.

[11] Patent Number: 5,692,710

[45] Date of Patent: Dec. 2, 1997

[54] INFLATABLE RESTRAINT

[76] Inventor: James W. Gee, Sr., 7600 W. 143rd St., Orland Park, Ill. 60462

[21] Appl. No.: 676,904

[22] Filed: Jul. 8, 1996

Related U.S. Application Data

[63] Continuation of Ser. No. 461,192, Jun. 5, 1995, abandoned.

[51] Int. Cl.$^6$ ............................................. B64D 11/06
[52] U.S. Cl. ........................ 244/118.5; 244/121; 441/116
[58] Field of Search ...................... 2/DIG. 3, 2; 441/116, 441/115, 102, 103; 244/118.5, 121, 122 AG, 122 B, 143, 146; 280/737, 740, 732

[56] References Cited

U.S. PATENT DOCUMENTS

| | | | |
|---|---|---|---|
| 1,182,841 | 5/1916 | Edmonds | 441/116 |
| 1,366,345 | 1/1921 | Bailey | 441/116 |
| 3,243,822 | 4/1966 | Lipkin | 244/121 |
| 3,921,944 | 11/1975 | Morrison | 244/143 |
| 4,602,385 | 7/1986 | Warren | 2/2 |
| 4,637,074 | 1/1987 | Taheri | 2/DIG. 3 |
| 4,685,151 | 8/1987 | Kincheloe | 2/DIG. 3 |
| 4,883,242 | 11/1989 | Becker et al. | 244/118.5 |
| 4,917,641 | 4/1990 | Katoh et al. | 441/115 |
| 5,297,944 | 3/1994 | Pomercy | 2/DIG. 3 |
| 5,335,882 | 8/1994 | Bonacci et al. | 244/122 R |
| 5,362,098 | 11/1994 | Guill | 244/122 AG |

FOREIGN PATENT DOCUMENTS 489551  2/1919  France ......................... 244/143

*Primary Examiner*—Galen L. Barefoot
*Attorney, Agent, or Firm*—Juettner Pyle Lloyd & Piontek

[57] ABSTRACT

An inflatable restraint is disclosed, and includes an elongated poncho having therein an air-tight bladder and a cervical aperture for insertion of the head of the individual. A front portion of the poncho is adapted for juxtaposition with a rear surface of a forward seat and a rear portion is adapted for juxtaposition with and between the back of the torso and a forward surface of a rearward seat when inflated. The front portion is longer than the rear portion and has a larger volumetric displacement when inflated and extends over the front torso and lower extremities of the individual. The rear portion extends over the back torso of the individual. An inflation means inflates the bladder and restrains the individual between the forward and rearward seats for protection of the individual during an emergency while traveling in a vehicle.

10 Claims, 2 Drawing Sheets

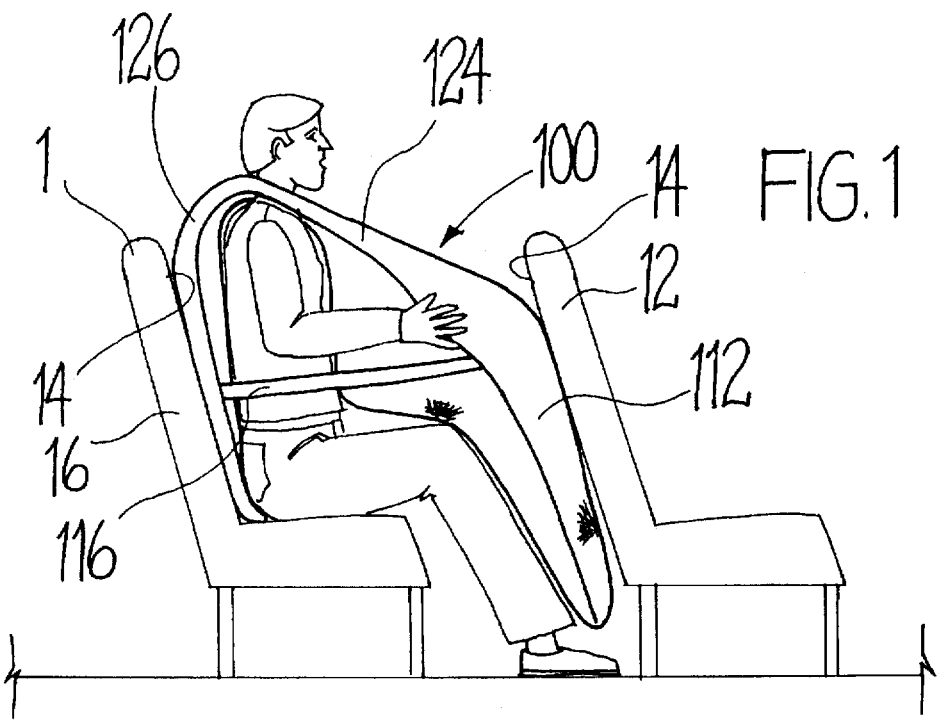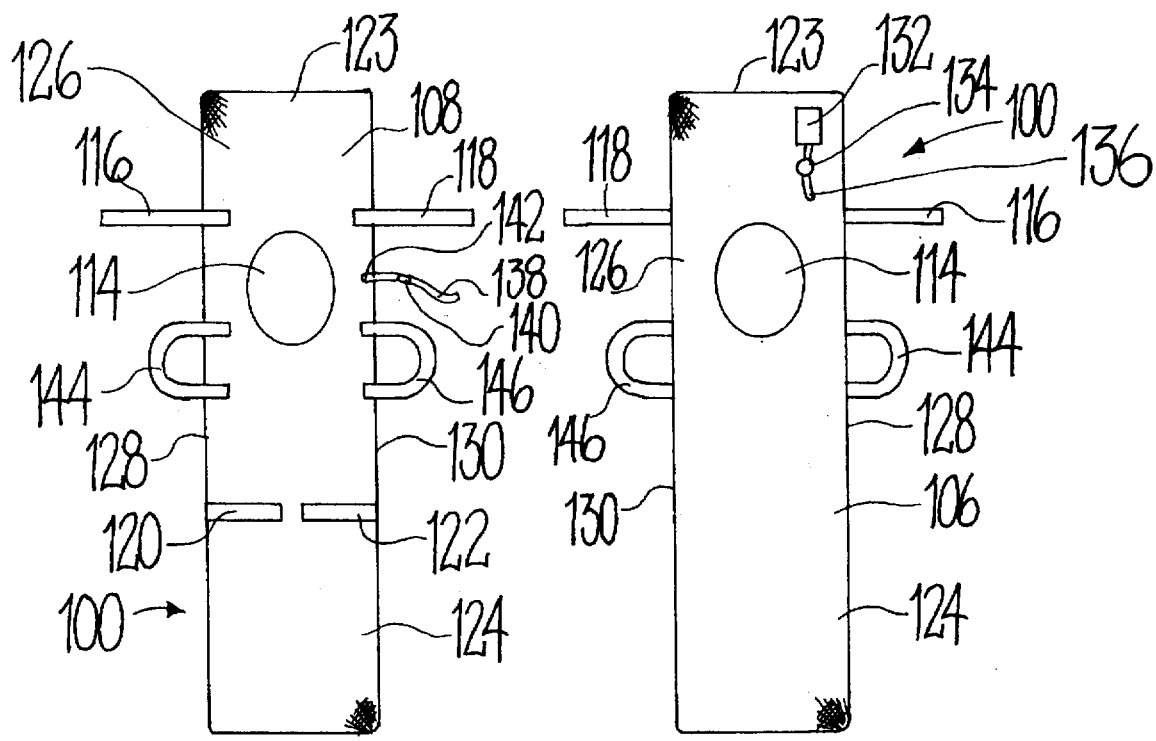

INFLATABLE RESTRAINT

This application is a continuation of application Ser. No. 08/461,192 filled on Jun. 5, 1995 now abandoned.

FIELD OF THE INVENTION

The present invention relates to an inflatable restraint for protection of an occupant in a vehicle during an accident. More particularly, the present invention is directed to a portable and inflatable restraint having a front and rear portion and a head opening for use over the torso of an occupant, in vehicles such as aircraft, to prevent injury upon impact and thus protect the occupant.

BACKGROUND OF THE INVENTION

Travel by aircraft is now a common occurrence for millions of travelers a year. However, as with all vehicles, injuries to occupants of aircraft due to accidents are not uncommon. In the most severe instances, such as a plane crash, little can be done to protect occupants except avoidance of the accident in the first instance. To this end, aircraft designers, operators, pilots and ground services have been enormously successful. Yet, despite the best efforts of these groups and individuals, accidents still happen.

At the other extreme, minor injuries can occur. Such may occur during very heavy turbulence, during aircraft taxiing to and from the runway (especially ground collisions with other aircraft or ground structures) or upon rough landings (especially with faulty landing gear). On those occasions, where the impact velocities tend to be far lower than the aforementioned crashes, the potential for protection of occupants can be enhanced. Indeed, many efforts have been made to improve the energy dissipating properties and other features of aircraft interiors, such as padding and effective seat lap belts, to prevent such injuries. However, to date, no readily available means exists to provide further protection.

Inflatable restraints, which to date have been primarily restricted to automotive applications (such as dashboard and steering column installations), are known, but have not been applied to aircraft for a number of reasons. As a threshold issue, the costs of such systems are very high. The propellant of such systems, sodium azide, is not preferred on-board aircraft. Unintended deployment is far more difficult to avoid in an aircraft subject to three degrees of freedom and significant impacts upon normal landing in comparison to an automobile due to the difficulty of locating and calibrating sensors which will only signal deployment when needed. Automobiles to date need only effectively provide inflatable restraint protection in a frontal impact. Automotive-type inflatable restraints are also relatively heavy and impose a weight penalty. It is difficult to mount such inflatable restraints in current aircraft seats and also provide reactive structure to the necessary mounting hardware, given current aircraft seating configurations and structures. Finally, current vehicular inflatable restraints are unidirectional, and would provide no protection against rear, lateral or vertical impacts.

Portable inflatable garments and collars are also known, such as those disclosed in U.S. Pat. Nos. 3,930,667, 4,089,065, 4,825,469 and 5,313,670. In U.S. Pat. Nos. 3,930,667 and 4,089,065, an inflatable garment worn by a motorcycle rider automatically inflates via pressurized gas upon unintended separation of the rider from the motorcycle. In U.S. Pat. No. 4,825,469, an inflatable garment for use in dangerous activities is disclosed, where two layers are releasably fastened one to the other during normal wear, but can be separated and inflated when desired by the user. Unfortunately, the foregoing references disclose garments for protection which are relatively bulky and difficult to get on or off, especially during an emergency. Moreover, as with most types of garments, fitting all body sizes with a single garment size is problematic. Thus, the garments of the foregoing references have not been considered useful in the protection of aircraft occupants as described above. In U.S. Pat. No. 5,313,670, a cervical protection helmet is disclosed, wherein a cervical collar is provided on a helmet to protect the neck regions of an individual. However, the collar offers only local protection for the neck regions and little protection for the lower torso and lower extremities of the individual.

SUMMARY OF THE INVENTION

In accordance with the foregoing drawbacks associated with the prior art, it is an object of the present invention to provide an inflatable restraint which will provide effective protection to the torso and lower extremities of an individual in an aircraft and essentially immobilize the same during very heavy turbulence, taxiing accidents and unusually rough landings.

It is a further object of the present invention to provide an inflatable restraint which is portable.

It is another object of the present invention to provide an inflatable restraint that can be used over other garments and with all body sizes.

It is yet another object of the present invention to provide an inflatable restraint that is inexpensive, lightweight and allows instantaneous deployment only when needed, while otherwise remaining relatively small and easily stored.

It is a further object of the present invention to provide an inflatable restraint that is self-inflating with an inert compressed gas and which requires no modifications to existing aircraft and other vehicles nor sensors.

It is a still further object of the present invention to provide an inflatable restraint that is easy to don and wear during an emergency.

These and additional objects of the present invention may be determined from a review of the instant disclosure, wherein there is disclosed an inflatable restraint for protection of an individual during an emergency while traveling in a vehicle. The present invention is especially useful when used in combination with fixed vehicle seating having a forward seat and a rearward seat, such as that found on airliners.

The restraint includes an elongated poncho which covers and protects an individual's torso and lower extremities when worn. The poncho is fabricated from an outer and inner surface sealed one to the other forming therebetween an air-fight bladder. A cervical aperture is provided through both surfaces for insertion and removal of the head of the individual. The poncho has a front portion forward of the aperture for juxtaposition with a rear surface of the forward seat when inflated and a rear portion for juxtaposition with and between the back of the torso and a forward surface of the rearward seat when inflated. Each portion has a longitudinal length along the elongated poncho, the front portion being of a longer length than that of the rear portion and being of larger volumetric displacement when inflated, such that the front portion extends over the front torso and lower extremities of the individual and the rear portion extends over the back torso of the individual when the poncho is worn.

An inflator in fluid communication with the bladder allows for selective inflation of the bladder. Preferably, the inflation means includes a container of a compressed inert gas such as $CO_2$, a valve having a closed and an open position and an orifice for selective communication of the container with the bladder. Placing the valve in the open position inflates the bladder and restrains and substantially immobilizes the individual between the forward and rearward seats for protection of the individual during an emergency while traveling in a vehicle.

As a particularly advantageous feature of the present invention, the suspended article can be rolled up and stored with minimum space and weight penalty when not needed. Carrying handles can be conveniently provided for further transport if necessary.

Other objects, advantages and features of the invention will become apparent upon a consideration of the following detailed description, when taken in conjunction with the accompanying drawings.

BRIEF DESCRIPTION OF THE DRAWINGS

FIG. 1 is an side view of the inflated inflatable restraint of the present invention as worn by an individual;

FIG. 4 is an inner plan view of the inflatable restraint of the present invention; and FIG. 5 is an outer plan view of the inflatable restraint of the present invention.

DETAILED DESCRIPTION OF THE INVENTION

Figure 2:
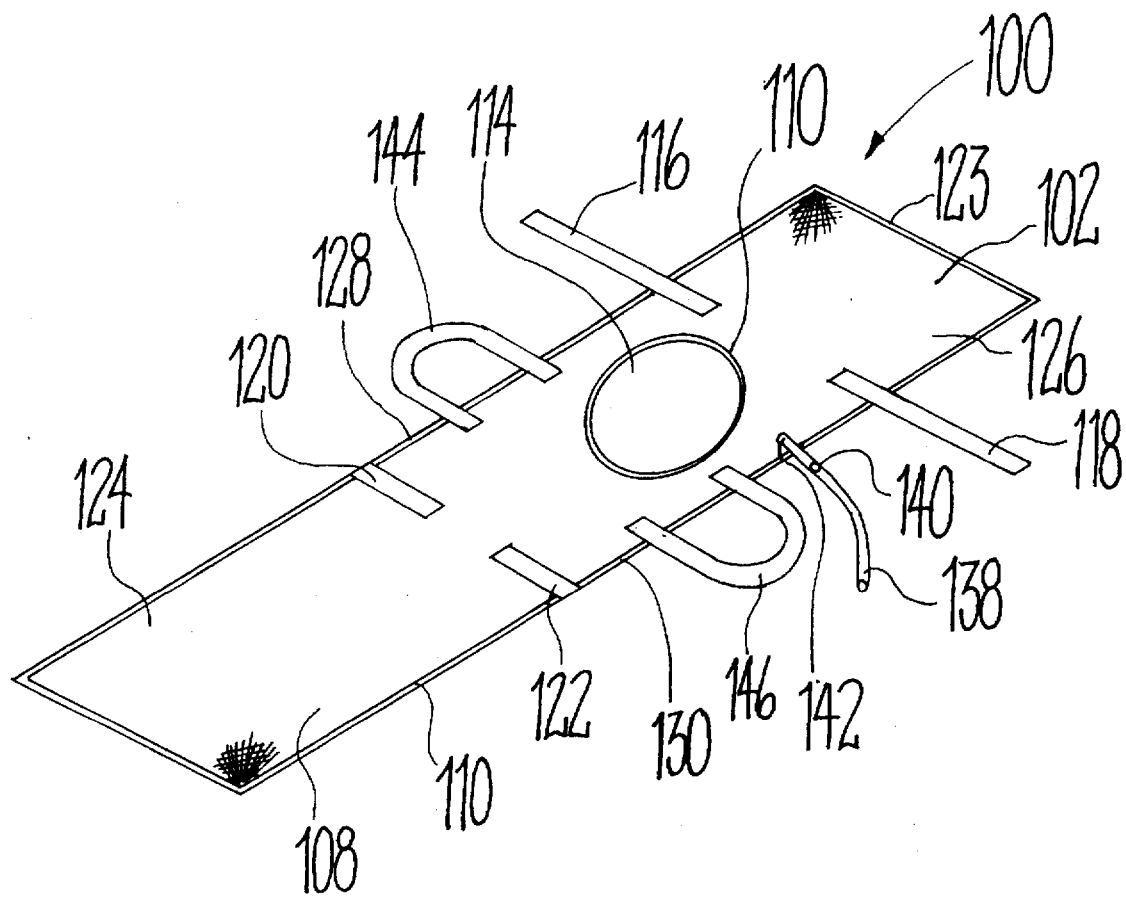
FIG. 2 is a perspective view of the inflatable restraint of the present invention.

There is illustrated in the accompanying drawings the inflatable restraint 100 of the present invention. As shown in FIG. 1, the inflatable restraint 100 of the present invention can be worn by an individual in a seating arrangement within a vehicle, such as an aircraft. The details of the invention can be better observed in FIG. 2, wherein the inflatable restraint 100 includes an elongated poncho 102, preferably having overall dimensions of 12 inches by 64 inches and constructed of any light-weight material substantially impermeable to air transmission therethrough. The poncho 102 is fabricated from an outer surface 106, better seen in FIG. 5, and an inner surface 108 sealed one to the other by any suitable and known substantially airtight method along seam 110 about their respective peripheries. This air-tight seal forms between outer surface 106 and inner surface 108 a bladder, shown inflated in FIG. 1.

A cervical aperture 114 is provided in the poncho 102 and extends through both surfaces 106, 108 for insertion and removal of a head of the individual, as shown in FIG. 1. The poncho 102 is further provided with fastening means, including velcro strips 116, 118 and velcro patches 120, 122 for attaching the front portion 124 and rear portion 126 of the poncho one to the other about the torso of the individual, as better shown in FIG. 1. The strips 116, 118 of velcro extend from opposite sides 128, 130 of the inner surface 108 of the poncho 102 transverse to and on the front portion 124 of the poncho 102 and the two patches 120, 122 of velcro are affixed to the inner surface 108 of the rear portion 126 of the poncho 102.

By positioning the center of the cervical aperture 114 closer to the distal edge 123 of the rear portion 126 of the poncho 102, preferably about 24 inches from the distal edge 123, the front portion 124 of the elongated poncho 102 is made longer in length than that of the rear portion 126 and is designed to have a larger volumetric displacement when inflated, such that the front portion 124 extends over the front torso and lower extremities of the individual and the rear portion 126 extends over the back torso of the individual when the poncho is worn, as best seen in FIG. 1.

An inflation means in fluid communication with the bladder 112 for selective inflation of the bladder 112 is provided to readily and rapidly inflated the same. The inflation means preferably includes, as shown in FIG. 5, a container 132 of a compressed inert gas, such as $CO_2$, a valve 134 having a closed and an open position and an orifice 136 for selective communication of the container with the bladder, such that placing the valve 134 in the open position inflates the bladder 112. Alternatively, or in combination with the self-inflating compressed gas means as a further safety feature, the inflation means can include a tube 138 accessible to the mouth of the individual. This alternative arrangement preferably further includes a one-way valve 140 in fluid communication with the tube to prevent the escape of air between breaths and an orifice 142 for establishing fluid communication of the tube 138 with the bladder 112, such that by blowing into the tube 138, the individual may inflate the bladder 112.

Figure 3:
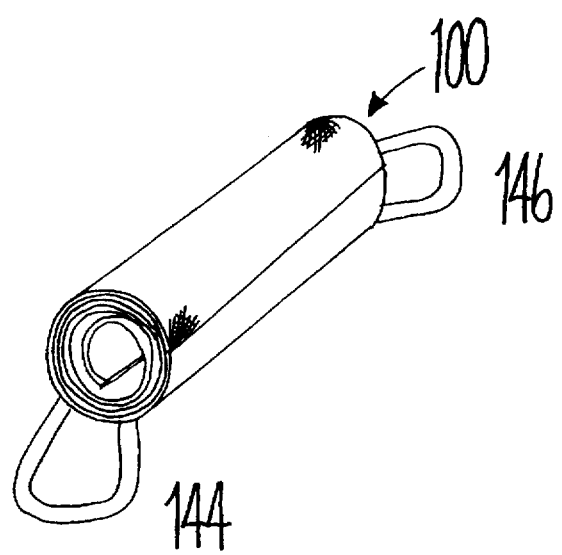
FIG. 3 is a perspective view of the inflatable restraint of the present invention in a rolled configuration.

Preferably, the inflatable restraint 100 is provided with handles 144, 146 along the two opposite side edges 128, 130 transverse to the length of the poncho 102, one each attached to each side for carrying the restraint. Moreover, as a particularly beneficial feature of the present invention, when in a deflated condition, the poncho 102 can be rolled into a compact package, as shown in FIG. 3.

In operation, again referring to FIG. 1, the individual is shown seated in rearward seat 10, located behind forward seat 12. As can be seen, when an emergency situation is detected, the individual may be instructed to take the inflatable restraint 100 out of storage and don the inflatable restraint 100 of the present invention by inserting the head through the cervical aperture 114, bringing the frontal portion 124 over the front of the torso and the lower extremities and the rear portion 126 over the torso back. The straps 116, 118 are then attached to the patches 120, 122 to secure the inflatable restraint 100 in position. When given the order to inflate the bladder 112, the individual can open valve 134 to allow the inert gas into the bladder 112 and inflate the same. Once the bladder 112 is inflated, the rearward surface 14 of the forward seat 12 is juxtaposed against the outer surface 106 of the forward portion 124 and the forward surface 14 of the rearward seat 16 is juxtaposed against the outer surface 106 of the rear portion 126. Thus inflated, the inflatable restraint 100 of the present invention securely wedges the individual between the forward and rearward seats 12, 16, immobilizing the same and substantially reducing the probability of injury.

While an embodiment of the invention have been described in detail, various modifications and other embodiments thereof may be devised by one skilled in the an without departing from the spirit and scope of the invention, as defined by the appended claims.

I claim:

1. A restraint for restraining a seated individual within a vehicle having fixed vehicle seating comprising a forward seat and a rearward seat during an impact event while traveling in the vehicle to reduce physical trauma to the individual, the restraint comprising:

a selectively inflatable elongated poncho covering and protecting a front and back of a torso and lower extremities of the individual when worn and inflated and capable of being rolled into a compact package when in a deflated condition, the poncho having an outer and inner surface sealed one to the other forming therebetween a bladder and an asymmetrically positioned cervical aperture relative an overall longitudinal length of the poncho through both surfaces for insertion and removal of a head of the individual, the poncho further having a front portion for contact with a rear surface of the forward seat when inflated and a rear portion for contact with and between the back of the torso and a forward surface of the rearward seat when inflated, each having a longitudinal length along the elongated poncho, the front portion being of a longer length than that of the rear portion and being of larger volumetric displacement when inflated, such that the front portion extends over the front torso and lower extremities of the individual and the rear portion extends over the back torso of the individual when the poncho is worn; and selectable inflation means in fluid communication with the bladder for selective inflation of the bladder, the inflation means further comprising a container of a compressed inert gas, a valve having a closed and an open position and an orifice for selective communication of the container with the bladder, such that placing the valve in the open position inflates the bladder and restrains the individual between the forward and rearward seats for protection of the individual during an emergency while traveling in a vehicle.

2. The restraint recited in claim 1, wherein the poncho further comprises fastening means adapted for attaching the front and rear portions of the poncho one to the other about the torso of the individual.

3. The restraint recited in claim 2, wherein the fastening means includes two strips of velcro extending from opposite sides of the inner surface of the poncho transverse to and on the length of the front potion of the poncho and two patches of velcro affixed to the inner surface of the rear potion of the poncho.

4. The restraint recited in claim 1, wherein the inflation means comprises a tube accessible to a mouth of the individual, a one-way valve in fluid communication with the tube and an orifice for establishing fluid communication of the tube with the bladder, such that by blowing into the tube, the individual may inflate the bladder.

5. The restraint recited in claim 1, wherein the elongated poncho has two opposite side edges transverse to the length of the poncho and two grasping means, one each attached to each side for carrying the restraint.

6. The restraint recited in claim 1, wherein the elongated poncho has two opposite side edges transverse to the length of the poncho and two grasping means, one each attached to each side for carrying the restraint when rolled into a compact package.

7. A method for restraining a seated individual within a vehicle having fixed vehicle seating comprising a forward seat and a rearward seat to reduce physical trauma to the individual during a impact event, the method comprising the steps of wearing a selectively inflatable restraint having an elongated poncho covering and protecting a front and back of a torso and lower extremities of the individual when worn and inflated and capable of being rolled into a compact package when in a deflated condition, the poncho having an outer and inner surface sealed one to the other forming therebetween a bladder and an asymmetrically positioned cervical aperture relative an overall longitudinal length of the poncho through both surfaces for insertion and removal of a head of the individual, the poncho further having a front portion adapted for juxtaposition with a rear surface of the forward seat when inflated and a rear portion adapted for juxtaposition with and between the back of the torso and a forward surface of the rearward seat when inflated, each having a longitudinal length along the elongated poncho, the front portion being of a longer length than that of the rear portion and being of larger volumetric displacement when inflated, such that the front portion extends over the front torso and lower extremities of the individual and the rear portion extends over the back torso of the individual when the poncho is worn; and inflating a selectable inflation means in fluid communication with the bladder for selective inflation of the bladder, the inflation means further comprising a container of a compressed inert gas, a valve having a closed and an open position and an orifice for selective communication of the container with the bladder, such that placing the valve in the open position inflates the bladder and restrains the individual between the forward and rearward seats for protection of the individual during a impact event while traveling in a vehicle.

8. The method of restraining an individual against physical trauma as recited in claim 7, wherein the selectable inflation means further comprises a tube accessible to a mouth of the individual, a one-way valve in fluid communication with the tube and an orifice for establishing fluid communication of the tube with the bladder, such that by blowing into the tube, the individual may inflate the bladder.

9. The method of restraining an individual against physical trauma as recited in claim 7, wherein the poncho further comprises fastening means adapted for attaching the front and rear portions of the poncho one to the other about the torso of the individual.

10. The method of restraining an individual against physical trauma as recited in claim 7, wherein the elongated poncho has two opposite side edges transverse to the length of the poncho and two grasping means, one each attached to each side for carrying the restraint when rolled into the compact package.

* * * * *